United States Patent [19]

Klinedinst

[11] Patent Number: 4,461,814

[45] Date of Patent: Jul. 24, 1984

[54] ELECTROCHEMICAL CELL

[75] Inventor: Keith A. Klinedinst, Marlborough, Mass.

[73] Assignee: GTE Laboratories Incorporated, Waltham, Mass.

[21] Appl. No.: 346,816

[22] Filed: Feb. 8, 1982

[51] Int. Cl.³ .................... H01M 4/96; H01M 6/14
[52] U.S. Cl. ................................. 429/42; 429/101; 429/196
[58] Field of Search .............. 429/101, 194, 196, 42, 429/44, 218; 423/448–452

[56] References Cited

U.S. PATENT DOCUMENTS

| | | | |
|---|---|---|---|
| 3,832,450 | 8/1974 | Wiggins | 423/450 |
| 4,020,248 | 4/1977 | Goebel | 429/194 |
| 4,060,668 | 11/1977 | Goebel | 429/122 |
| 4,219,443 | 8/1980 | Klinedinst et al. | 429/196 X |
| 4,272,593 | 6/1981 | Klinedinst | 429/101 |
| 4,367,208 | 1/1983 | Glasstetter et al. | 423/449 |
| 4,367,266 | 1/1983 | Kalnoki-Kis | 429/101 |
| 4,367,268 | 1/1983 | Behl | 429/101 |

Primary Examiner—Anthony Skapars
Attorney, Agent, or Firm—David M. Keay

[57] ABSTRACT

A primary electrochemical cell having an oxidizable active anode material, a cathode current collector including a layer of a catalyst material for reducing the liquid cathode material, and an electrolytic solution comprising a liquid cathode material and an electrolyte solute dissolved therein. The catalyst material comprises a carbon black having a surface area of 250 square meters per gram or greater and a dibutyl phthalate absorption number of 125 cubic centimeters per 100 grams of carbon black or greater.

9 Claims, 7 Drawing Figures

ELECTROCHEMICAL CELL

BACKGROUND OF THE INVENTION

This invention relates to primary electrochemical cells. More particularly, it is concerned with primary electrochemical cells having an oxidizable active anode material, a cathode current collector, and an electrolytic solution comprising a reducible liquid cathode material and an electrolyte solute dissolved therein.

A particularly effective class of primary electrochemical cells which employs soluble or liquid cathode materials, as opposed to the more conventional solid cathode cells, has undergone rapid development in recent years. In these cells, the active cathode material is usually a fluid solvent for an electrolyte solute which provides conductivity. The active anode of these cells is usually lithium or other highly electropositive metal. During discharge, the solvent is electrochemically reduced on a cathode current collector to yield ions, e.g. halide ions, which react with positive metal ions from the anode to form insoluble metal salts, e.g. metal halides. The cathde current collector does not take part in the reaction itself, but simply provides a support on which the reaction can occur, supplying electrons given up during the oxidation of the anode material.

A wide variety of materials have been employed to make up the cathode current collector or to provide a catalytically active surface thereof. An improved cathode current collector and methods of making it are described in U.S. Pat. No. 4,219,443 to Keith A. Klinedinst and Francis G. Murphy. This patent describes a cathode current collector having a surface layer of a finely divided catalyst for reducing the liquid cathode consisting of gold, platinum, or carbon black. U.S. Pat. No. 4,272,593 to Keith A. Klinedinst describes a cell having a cathode current collector including a catalyst which is a composite of carbon and platinum. This cathode current collector provides many of the advantages of a cathode current collector employing platinum at lower cost. However, the cost of platinum is such that electrochemical cells employing these cathode current collectors are uneconomical for many applications.

SUMMARY OF THE INVENTION

It is an object of the present invention to provide a primary electrochemical cell with an improved cathode current collector.

it is a more specific object of the present invention to provide a primary electrochemical cell with an improved cathode current collector which enables high discharge rates and high current densities at low cost.

These and other objects are accomplished in primary electrochemical cells in accordance with the present invention comprising an oxidizable active anode material, a cathode current collector including a catalyst for reducing the liquid cathode material which comprises carbon black characterized by a surface area of 250 square meters per gram or greater and a dibutyl phthalate absorption number of 125 cubic centimeters per 100 grams of carbon black or greater bonded to an inert electrically-conductive substrate, and an electrolytic solution, in contact with the anode material and cathode current collector, which comprises a reducible liquid cathode material and an electrolyte solute dissolved therein. It has been found that cathode current collectors employing catalysts of carbon black having high surface area and high absorption characteristics as defined above provide improved cell operating characteristics as compared to those obtained from cells employing catalysts of carbon black in accordance with prior art teachings.

For a better understanding of the present invention, together with other and further objects, advantages, and capabilities thereof, reference is made to the following discussion and appended claims in connection with the above-described drawings.

DETAILED DESCRIPTION OF THE INVENTION

In the following specification and claims when an electrochemical cell is designated as having a particular anode or cathode material, that anode or cathode, or anode or cathode material, means the electrochemically active component, and not the non-consumable electrically conducting, inert or catalytic current collector or anode current collector. Such an electrode may be in contact with, or form a part of, a suitable substrate, in the case of the anode or will be a fluid in the case of the cathode. The catalyst materials defined herein are active only in the sense that they actively catalyze the reduction of the liquid cathode. The catalysts are not themselves reduced under the desired cell operating conditions.

The improved cathode current collector of the present invention includes a catalyst which comprises carbon black having a high surface area and high absorption characteristics. It is desirable that the surface area of the carbon black particles be 250 square meters per gram or greater and that the carbon black have a dibutyl phthalate (DBP) absorption number of 125 cubic centimeters per 100 grams of carbon black or greater. Further improved cell operating characteristics are obtained by employing carbon black having a surface area of 1000 square meters per gram or greater and a DBP absorption. number of 230 cubic centimeters per 100 grams or greater. The surface area of the carbon particles may be determined by a standard test such as the Brunauer, Emmett, Teller (BET) nitrogen absorption surface area test. The DBP absorption number is determined by employing the test procedure of ASTM No. D-2414-70 for determining the absorption characteristics of carbon black.

Figure 1:
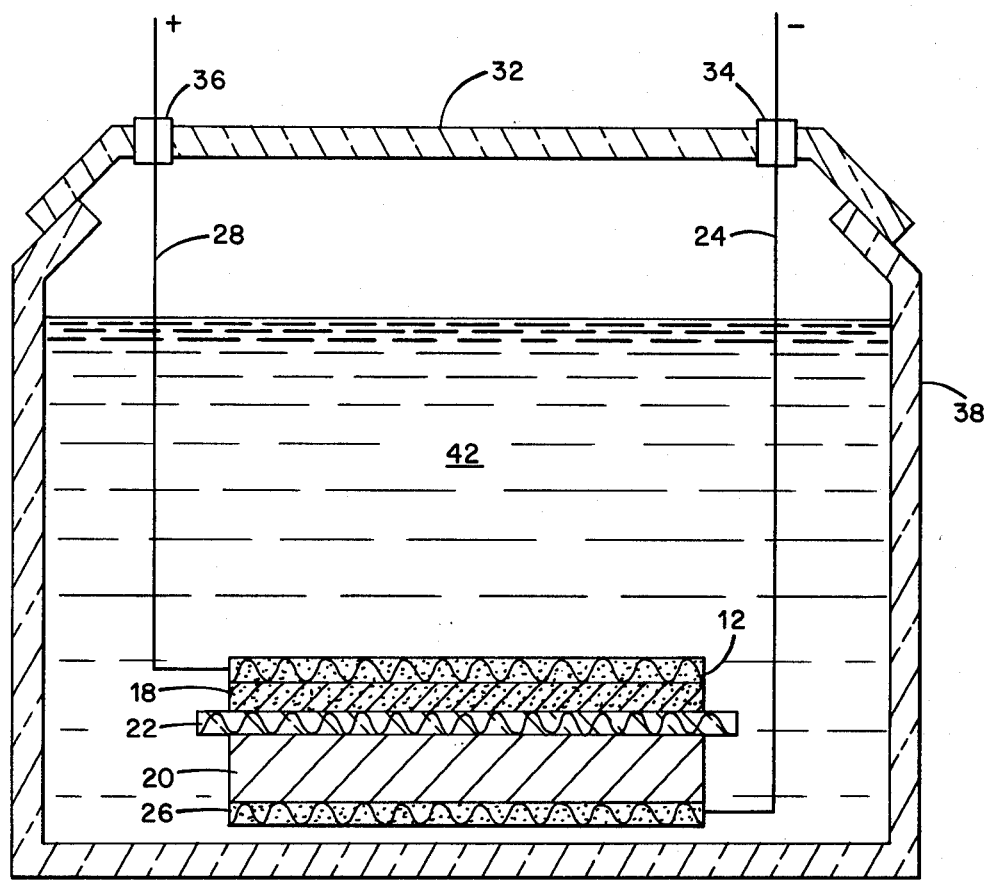
FIG. 1 is a schematic representation in crosssection of a primary electrochemical cell employing a cathode current collector in accordance with the present invention.

FIG. 1 is a schematic illustration of an electrochemical cell in accordance with the present invention. The cathode current collector includes an inert, electrically conductive substrate 12 and a layer 18 of a catalyst of carbon black particles in accordance with the present invention, the layer of carbon black particles providing a catalyst surface for reducing the liquid cathode. The cathode current collector 12, 18 is preferably separated from the oxidizable anode 20 by a porous separator 22. The anode is electrically connected to a lead wire 24 by a current collector 26. In a similar manner cathode current collector 12, 18 may be electrically connected to a lead wire 28. The lead wires 24 and 28 pass through the cell cover 32 by way of seals 34 and 36 respectively. The cell cover 32 is in close sealing engagement with the main container 38. The interior of the cell container 38 is filled with an electrolytic solution 42 which comprises a fluid, reducible soluble cathode material and an electrolyte solute dissolved therein.

The electrically conductive substrate 12 of the cathode current collector 12, 18 may be any of various materials which are electrically conductive and inert in the presence of the materials employed in the cell. Representative substrate materials are nickel, nickel alloys, and stainless steel. In the particular embodiments under discussion, the substrate is an expanded screen of nickel. The catalyst layer 18 is bonded to the substrate 12 by being pressed into the screen.

The anode 20 is an oxidizable material and is preferably lithium metal. The electrolytic solution 42 comprises a reducible liquid cathode solvent such as a fluid oxyhalide and an electrolyte solute dissolved therein. In the present specific embodiments the solvent is thionyl chloride. An electrolyte solute is dissolved in the solvent in order to raise its conductivity. In the specific embodiments under discussion the solute is lithium tetrachloroaluminate. A thorough discussion of various useful anode materials, cathode solvents, and electrolyte solutes is provided in the above-mentioned patent to Klinedinst and Murphy which is incorporated herein by reference.

The following examples are for the purpose of further illustrating and explaining the present invention, and are not to be taken as limiting the scope thereof. In all of the following examples the cathode current collectors employed a substrate in the form of an expanded nickel screen. The active catalyst layers were formed by mixing carbon black granules with a thermoplastic polymer, specifically 10% by weight polytetrafluoroethylene (PTFE), as a binder. The mixtures were pressed by rolling into the expanded metal screen substrates to a thickness of 1.0 mm. For each individual cell a piece 1.0 $cm^2$ was cut from a cathode current collector. The cathode current collector piece was separated from the lithium anode by a 5 mil separator. The electrolytic solution was 1.8M lithium tetrachloroaluminate solute in a solvent of thionyl chloride.

EXAMPLE I

Cathode current collectors having an active catalyst layer fabricated from an oil furnace carbon black designated Ketjen carbon black were fabricated as above. Similar cathode current collectors employing well known acetylene carbon black, specifically Shawinigan acetylene carbon black, 50% compressed, were also fabricated as above. The Ketjen black has a surface area of 1,000 $m^2/g$ and a DBP absorption number of 340 $cm^3/100$ g. Shawinigan acetylene black has a surface area of 60 $m^2/g$ and a DBP absorption number of 460 $cm^3/100$ g.

Figure 2:
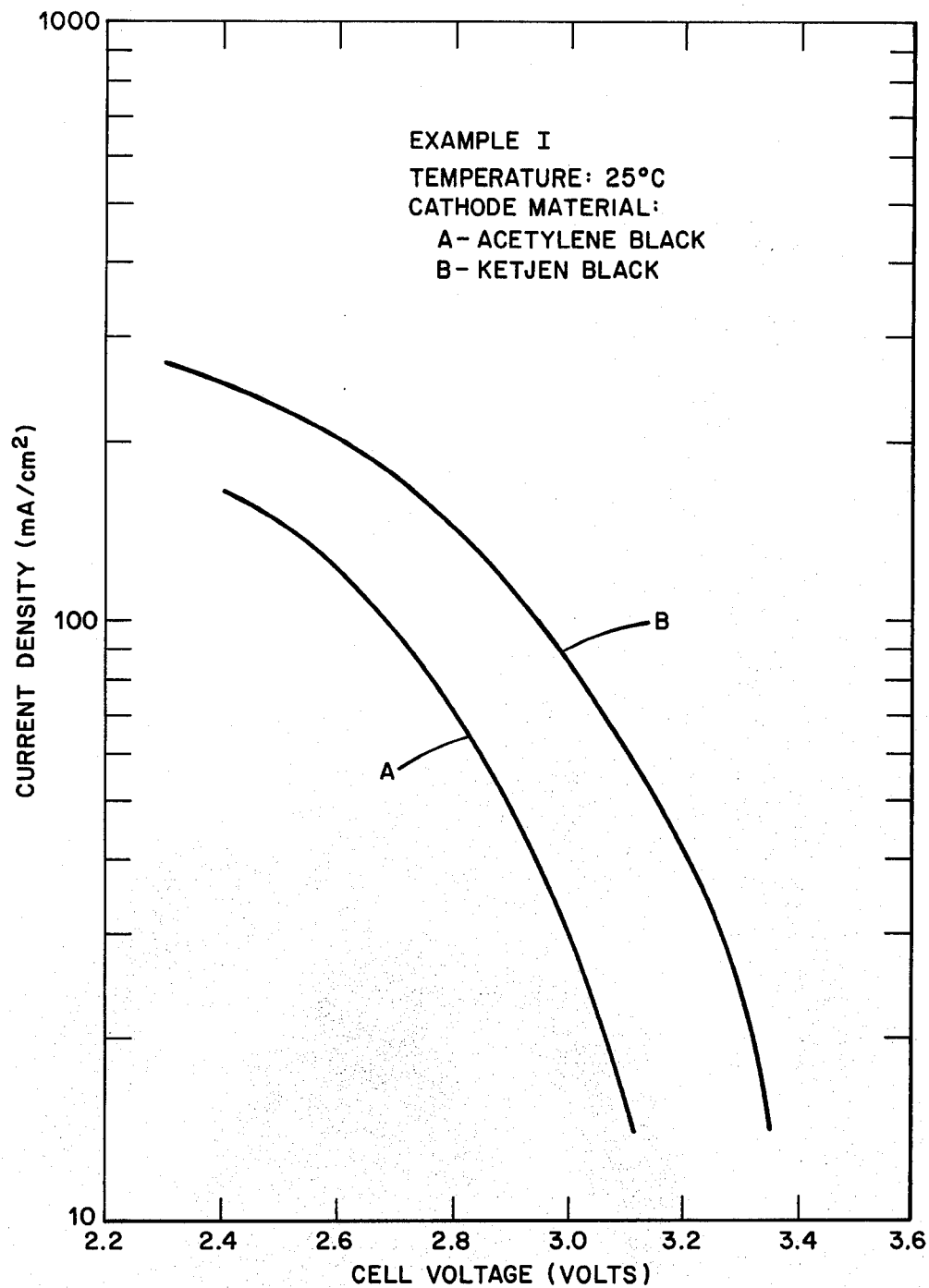
FIG. 2 is a graph showing curves of cell voltage versus current density for prior art electrochemical cells and for cells in accordance with the present invention as described in Example I.
Figure 3:
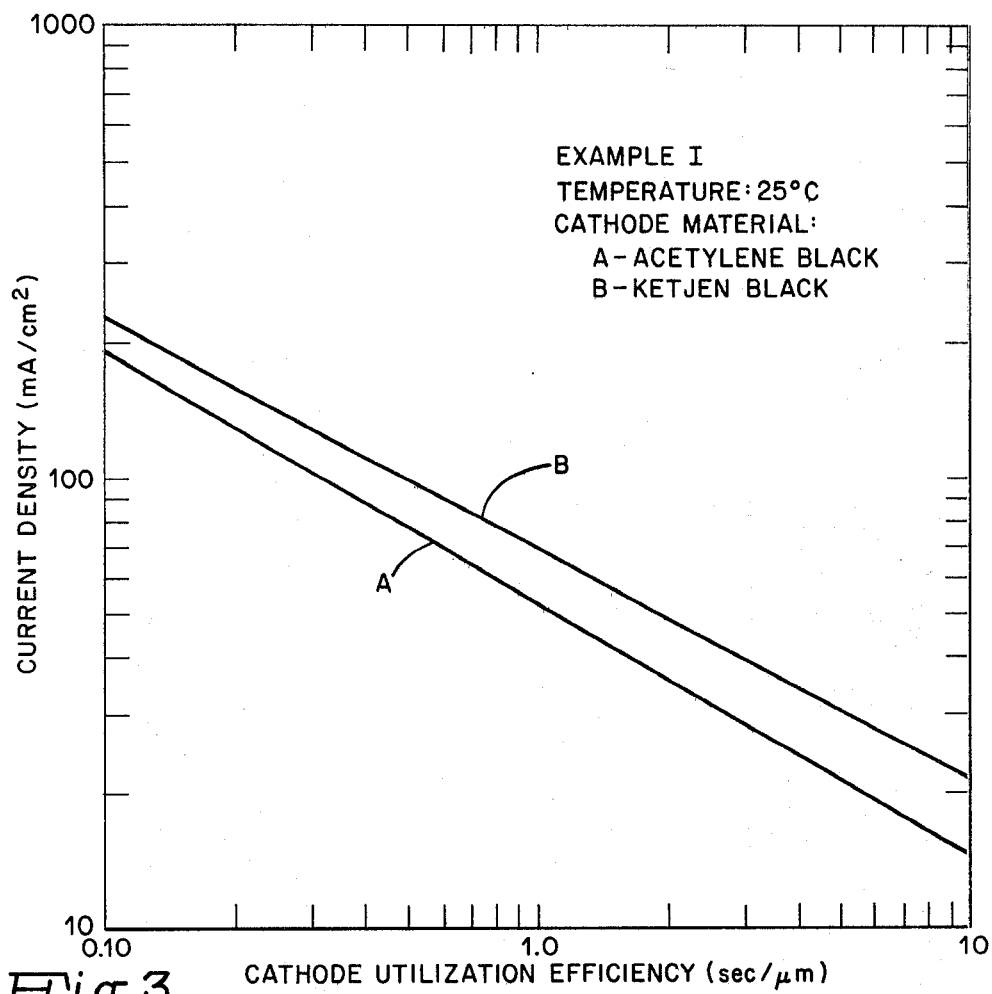
FIG. 3 is a graph showing curves of cathode utilization efficiency versus current density for prior art cells and for cells in accordance with the present invention as described in Example I.
Figure 4:
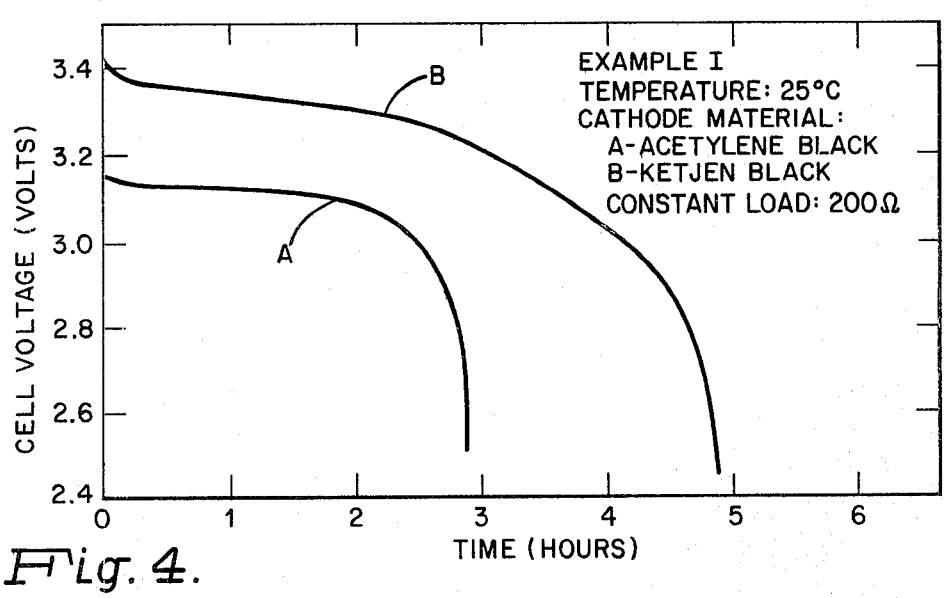
FIG. 4 is a graph showing the discharge curves for prior art cells and for cells in accordance with the present invention as described in Example I.

FIG. 2 is a graph of curves of cell voltage versus current density for prior art cells employing acetylene black as the active catalyst material and for cells in accordance with the present invention employing Ketjen black as the active catalyst material. FIG. 3 is a graph showing curves of cathode utilization efficiency versus current density for cells with cathode current collectors employing acetylene black and cells employing Ketjen black. Cathode utilization efficiency is the discharge duration in units of time (t) per unit of cathode thickness (T) expressed in seconds per micrometers (sec/$\mu$m). The discharge duration was taken as the time required for the load voltage of the cell to drop to 90% of its average plateau value. The loads across the cells for the tests compiling the data were 200 ohms. FIG. 4 illustrates discharge curves for cells employing acetylene black as the catalyst material and for cells employing Ketjen black.

EXAMPLES II-X

Table I is a tabulation of characteristics and test data on several carbon blacks employed as catalyst materials in cathode current collectors for electrochemical cells. In obtaining the test data the cells were discharged across constant loads of 100 ohms. The examples II-X are arranged in the table by surface area. Also shown is the DBP absorption number. The cell test results shown are average output voltage ($E_{avg}$), average current density ($I_{avg}$), and cathode utilization efficiency (t/T).

TABLE I

| Example | Carbon Black | Source | Surface Area ($m^2/g$) | DBP Absorption No. ($cm^3/100$ g) | $E_{avg}(V)$ | $I_{avg}\left(\dfrac{mA}{cm^2}\right)$ | $\dfrac{t}{T}\left(\dfrac{sec}{\mu m}\right)$ |
|---|---|---|---|---|---|---|---|
| II | Acetylene Black 50% Compressed | Gulf | 60 | 460 | 2.98 | 29.8 | 2.88 |
| III | Vulcan XC-72 | Cabot | 250 | 180 | 3.18 | 31.8 | 3.97 |
| IV | CSX 99 | Cabot | 425 | 125 | 3.26 | 32.6 | 3.53 |
| V | Ketjen | Armak | 1000 | 340 | 3.26 | 32.6 | 5.24 |
| VI | CSX 150A2 | Cabot | 1025 | 320 | 3.27 | 32.7 | 4.40 |
| VII | CSX 179B | Cabot | 1060 | 335 | 3.28 | 32.8 | 4.78 |

TABLE I-continued

| Example | Carbon Black | Source | Surface Area (m²/g) | DBP Absorption No. (cm³/100 g) | $E_{avg}(V)$ | $I_{avg}\left(\dfrac{mA}{cm^2}\right)$ | $\dfrac{t}{T}\left(\dfrac{sec}{\mu m}\right)$ |
|---|---|---|---|---|---|---|---|
| VIII | 40-220 | Columbian | 1100 | 230 | 3.18 | 31.8 | 4.39 |
| IX | CSX 174 | Cabot | 1222 | 420 | 3.26 | 32.6 | 5.78 |
| X | Anthralur KC | Lurgi | 1260 | 95 | 3.01 | 30.1 | 1.42 |

The sources for the carbon blacks as indicated in Table I are: Gulf is Gulf Oil Chemicals Company, 111 Charlotte Place, Englewood Cliffs, N.J.; Cabot is Cabot Corp., Concord Road, Billerica, Mass.; Armak is Armak Company, Route 78, Burt, N.Y.; Columbian is Columbian Chemicals Company, Box 37, Tulsa, Okla.; and Lurgi is Lurgi Umwelt und Chemotechnik Gmbh, Postfach 11981 D-6000, Frankfurt aum Main, Germany.

As can be seen from Table I carbon blacks having low surface areas and high DBP absorption numbers or having high surface areas and low DBP absorption numbers produce cells having low average voltages ($E_{avg} \approx 3.0$ V) and low cathode utilization efficiency ($t/T < 3.0$ sec/$\mu$m). Carbon blacks having both high surface area ($\geq 250$ m²/g) and high DBP absorption number ($\geq 125$ cm³/100 g) produce cells having high average voltages ($E_{avg} \approx 3.2$–3.3 V) and high cathode utilization efficiencies ($t/T > 3.5$ sec/$\mu$m). Highest cathode utilization efficiencies ($t/T > 4$ sec/$\mu$m) were obtained with carbon blacks having surface areas of 1000 m²/g or greater and DBP absorption numbers of 230 cm³/100 g or greater.

EXAMPLE XI

Figure 5:
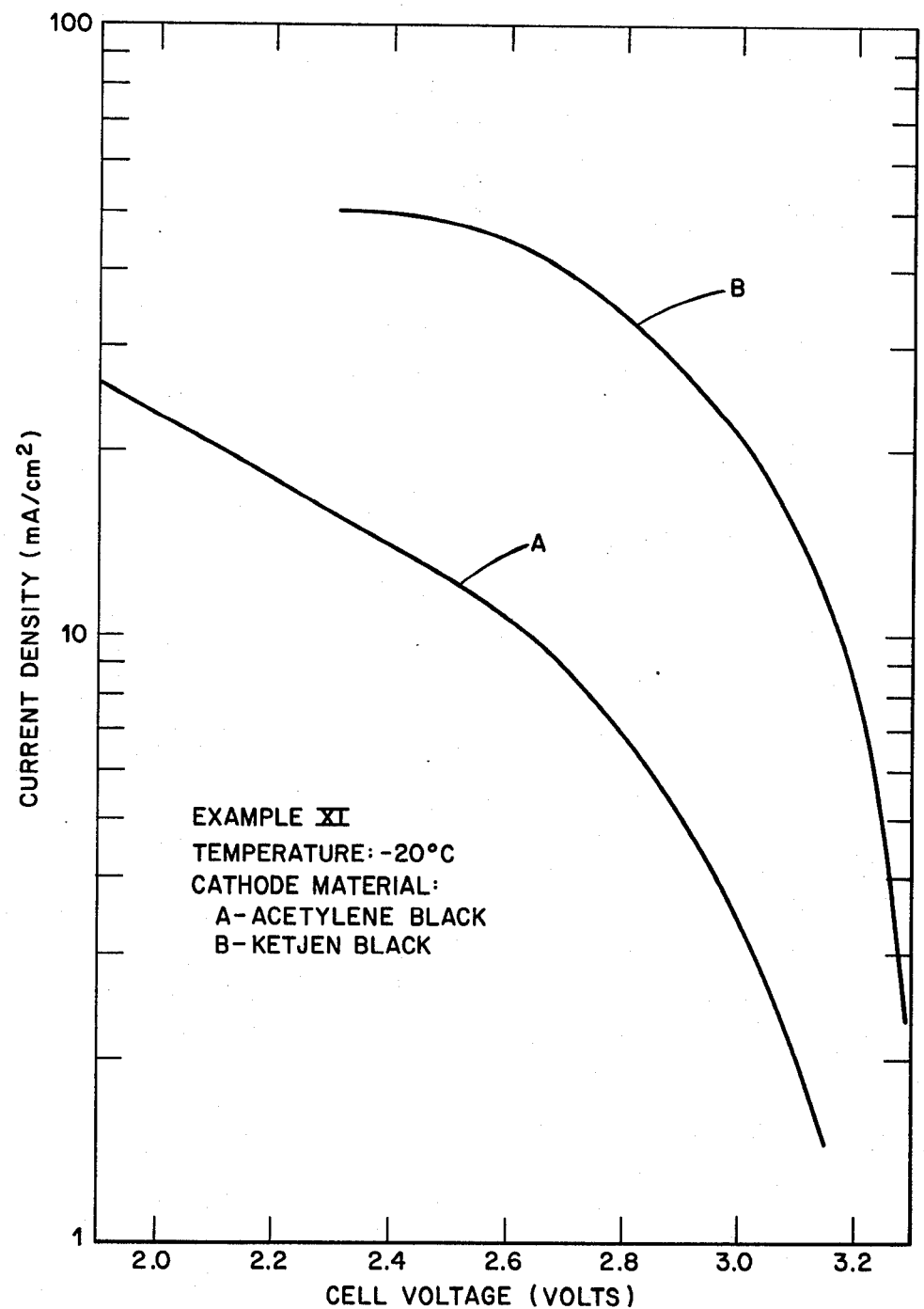
FIG. 5 is a graph showing curves of cell voltage versus current density at $-20°$ C. for prior art cells and for cells in accordance with the present invention as described in Example XI.
Figure 6:
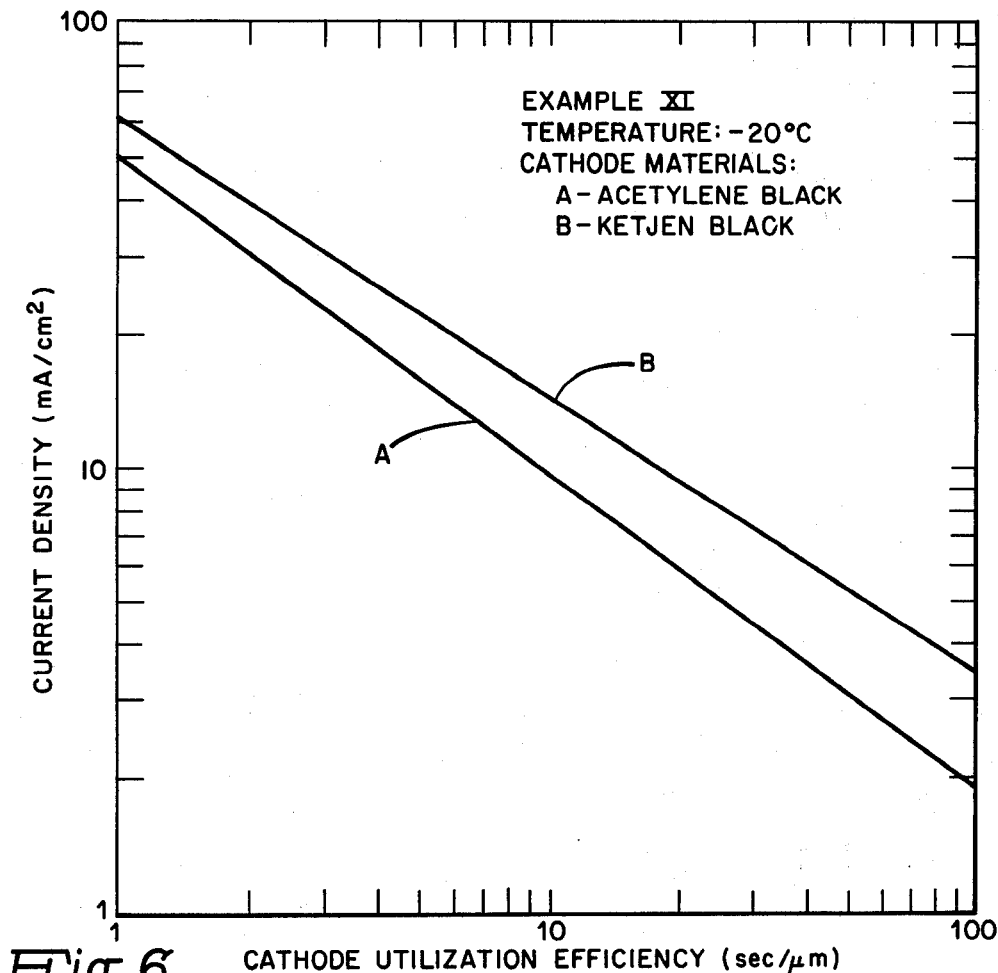
FIG. 6 is a graph showing curves of cathode utilization efficiency versus current density at $-20°$ C. for prior art cells and for cells in accordance with the present invention as described in Example XI.
Figure 7:
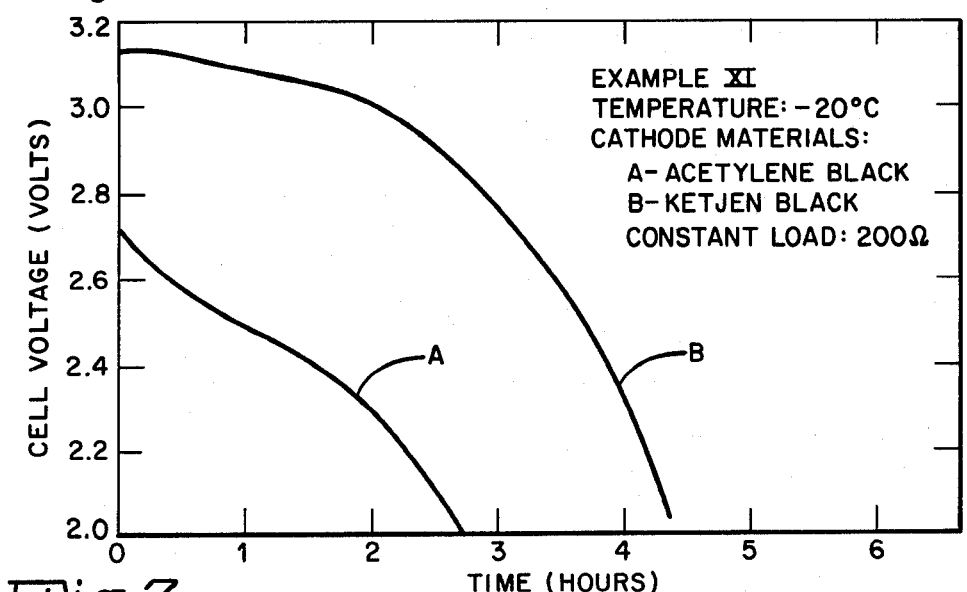
FIG. 7 is a graph showing discharge curves at $-20°$ C. for prior art cells and for cells in accordance with the present invention as described in Example XI.

Cells employing cathode current collectors having an active catalyst material of acetylene carbon black in accordance with prior art techniques and cells employing Ketjen black in accordance with the present invention were fabricated as described hereinabove. The cells were tested at $-20°$ C. producing the comparative curves of cell voltage versus current density as shown in FIG. 5, cathode utilization efficiency versus current density as shown in FIG. 6, and discharge curves as shown in FIG. 7. The cells were tested under a constant load of 200 ohms. As can be seen by the curves, the improvements obtained with cells in accordance with the present invention are even more pronounced at extremely low temperatures.

Thus, electrochemical cells containing cathode current collectors employing carbon blacks having high surface area and high DBP absorption numbers as the active catalyst material show superior performance characteristics over cells employing acetylene carbon black as the catalyst material.

While there has been shown and described what are considered preferred embodiments of the present invention, it will be obvious to those skilled in the art that variours changes and modifications may be made therein without departing from the invention as defined by the appended claims.

What is claimed is:

1. A primary electrochemical cell comprising an oxidizable active anode material;

a cathode current collector including a catalyst for reducing the liquid cathode material comprising carbon black characterized by a surface area of 250 square meters per gram or greater and a dibutyl phthalate absorption number of 125 cubic centimeters per 100 grams of carbon black or greater bonded to an inert electrically-conductive substrate; and an electrolytic solution, in contact with the anode material and cathode current collector, comprising a reducible liquid cathode material and an electrolyte solute dissolved therein.

2. A primary electrochemical cell in accordance with claim 1 wherein the catalyst comprises a mixture of carbon black and a thermoplastic polymer.

3. A primary electrochemical cell in accordance with claim 2 wherein the catalyst contains about 90% carbon black by weight and about 10% polytetrafluoroethylene by weight.

4. A primary electrochemical cell in accordance with claim 3 wherein the oxidizable anode material comprises lithium metal; and the reducible liquid cathode material is a fluid oxyhalide.

5. A primary electrochemical cell in accordance with claim 4 wherein the reducible liquid cathode material is thionyl chloride.

6. A primary electrochemical cell in accordance with claim 1 wherein the carbon black is characterized by a surface area of 1000 square meters per gram or greater and a dibutyl phthalate absorption number of 230 cubic centimeters per 100 grams of carbon black or greater.

7. A primary electrochemical cell in accordance with claim 6 wherein the catalyst comprises a mixture of carbon black and a thermoplastic polymer.

8. A primary electrochemical cell in accordance with claim 7 wherein the catalyst contains about 90% carbon black by weight and about 10% polytetrafluoroethylene by weight.

9. A primary electrochemical cell in accordance with claim 8 wherein the oxidizable anode material comprises lithium metal; and the reducible liquid cathode material is thionyl chloride.

* * * * *